3,402,150
NON-CRYSTALLIZABLE COPOLYCARBONATE/
URETHANE RESINS PREPARED FROM 2,2,4,4-
TETRAALKYL-1,3-CYCLOBUTANEDIOL AND
A PIPERAZINE
John J. Gardikes, Somerville, and Markus Matzner, Highland Park, N.J., assignors to Union Carbide Corporation, a corporation of New York
No Drawing. Filed Dec. 10, 1965, Ser. No. 513,086
12 Claims. (Cl. 260—77.5)

ABSTRACT OF THE DISCLOSURE

Novel non-crystallizable copolycarbonate/urethane resins prepared from 2,2,4,4-tetraalkyl-1,3-cyclobutanediol and a piperazine. The resins have reduced viscosity of at least 0.4 and contain the cyclobutandiol polycarbonate in the form of a recurring block polycarbonate structure.

This invention relates to novel linear copolycarbonate/urethane resins prepared from 2,2,4,4-tetraalkyl-1,3-cyclobutanediol and a piperazine and more particularly to non-crystallizable copolycarbonate/urethane resins prepared from 2,2,4,4-tetraalkyl-1,3-cyclobutanediol and a piperazine.

Heretofore polycarbonate resins produced from various alkyl substituted cyclobutanediols have been found to exhibit exceptional characteristics such as outstanding weathering properties, heat and light stability, enhanced strength properties and inertness. Until the present time, however, it has not been possible to produce polycarbonate resins based on a cyclobutanediol which are non-crystallizable. Under certain conditions, such as annealing, orientation, selective solvent treatment, and melt shear, such resins crystallize most readily. Although the crystalline form has demonstrated many potential uses, such as in molding materials, oriented fibers, and biaxially oriented films, the accidental onset of crystallization during fabrication, and more important while functioning as a finished product, might prevent its use in some areas of application. Crystallization changes the polymer properties and the finished article becomes opaque. The latter can be most undesirable when clarity is of importance in the finished article.

Accordingly, it is an object of this invention to provide polycarbonate resins based on cyclobutanediols which exhibit the aforementioned enhanced characteristics but are non-crystallizable.

Broadly, the present invention provides a linear copolycarbonate/urethane resin composed of recurring structural units having the general formula:

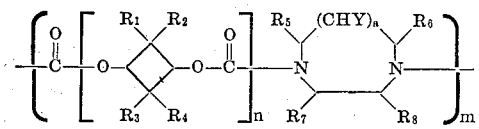

wherein $R_1$, $R_2$, $R_3$ and $R_4$ are selected from the group consisting of lower alkyl groups containing from 1 to 4 carbon atoms, Y, $R_5$, $R_6$, $R_7$, $R_8$ are selected from the group consisting of hydrogen and lower alkyl groups containing from 1 to 4 carbon atoms, $a$ is an integer from zero to one inclusive, $m$ is an integer having a value such that the reduced viscosity of the polymer is at least 0.4, and $n$ is an integer having a value of from about 2 to about 19. Preferably the average value of $n$ is from about 3 to about 11.

Several methods which can be utilized to form the polymers of this invention have as reactants 2,2,4,4-tetra-alkyl-1,3-cyclobutanediol, a piperazine, and diphenyl carbonate or the derivative N,N'-di(carbophenoxy) piperazine.

The remainder of this specification will particularly relate to copolycarbonate/urethanes prepared from 2,2,4,4-tetramethyl-1,3-cyclobutanediol which will hereinafter be designated as TMCB diol. This diol can be used as either the cis or trans-isomer or a mixture of such isomers. Unless otherwise specified in the process described below, a mixture of these isomers is employed.

One of the preferred processes for preparing the copolycarbonate/urethane resins of the present invention utilizes as starting materials the cyclobutane derivatives represented by the following structure:

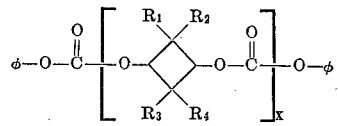

wherein $R_1$, $R_2$, $R_3$ and $R_4$ are selected from the group consisting of lower alkyl groups containing from 1 to 4 carbon atoms and $x$ is an integer having a value no greater than $n$ of the aforementioned general formula. These materials range from the bis(phenyl carbonate) of tetraalkylcyclobutanediol ($x=1$) to a phenyl carbonate-terminated tetraalkylcyclobutanediol polycarbonate. While all the derivatives can be prepared from the TMCB diol whose cis-trans-isomer content is about 50:50, pure isomers or any combination of cis-trans-isomers can also be used. However, it is preferred to prepare derivatives from the TMCB diol having 35 to 50 mole percent of trans-isomer. These derivatives are reacted with piperazine at temperatures above 100° C. in the presence of or absence of an inert solvent. Depending on the value of $x$ and on the desired composition of the copolycarbonate/urethane TMCB diol can constitute the third component of the reactants. The reaction in its general form is described by the following equation:

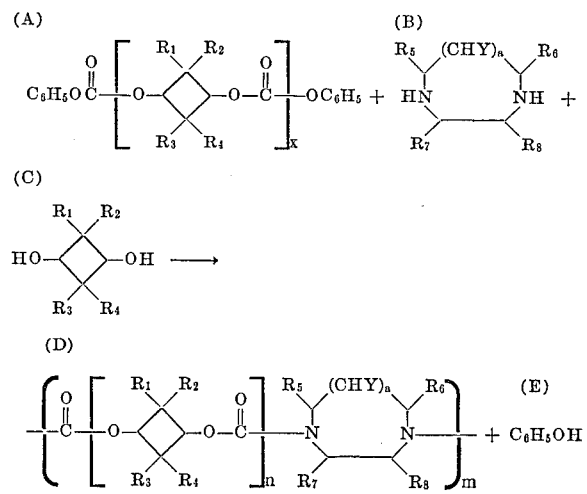

In the above equation $A=B+C$, $n=Ax+C$, and $E=2A$. $Ax$ must be equal to or less than $n$; when $Ax=n$ then C must be zero. $x$ must also be a known value. If the mole percent of piperazine or piperazine derivative in the polymer is defined as $$\frac{100B}{n+B}$$

for a given polymer composition the mole ratio A:B:C may be calculated from the above equations. In other words, the values of $x$, A, B and C are such that the requirements for $n$, and thus the mole percent of piperazine or piperazine derivative, are met as indicated in the general formula.

The reaction vessel containing the calculated quantities of the reaction materials is heated first for a short period of time at 120–140° C. If the reaction materials do not melt during the initial heating, an inert solvent such as phenol, diethylene glycol dimethyl ether, o-dichlorobenzene, 1,2,4-trichlorobenzene, or biphenyl is used to dissolve the reactants. The temperature is then raised to about 200–300° C. to distill the phenol produced from the reaction and solvent. The last traces of phenol are removed by raising the temperature to 250–260° C. and applying a gradual vacuum into the system. Operating pressures can be at atmospheric or lower and if desired, catalysts such as alkali and alkaline earth metals, oxides and hydroxides can be added to the reaction vessel.

All of the reactions, starting from TMCB diol, diphenyl carbonate and piperazine can be adapted in a continuous process unit in order to prepare the subject copolycarbonate/urethanes. The TMCB diol and its derivatives can be substituted completely, in part, or with a mixture of any other tetraalkylcyclobutanediol and their bis(phenyl carbonate) derivatives. Part of the TMCB diol can also be substituted with an aliphatic diol or its bis(phenyl carbonate) derivative. The piperazine can be replaced partly or completely with another diamine containing at least one hydrogen on each of the nitrogen atoms.

The piperazine residues suitably utilized as polymer constituents in the present invention are those derived from piperazine, homopiperazine, or any of the substituted piperazines in which the substituent groups are monovalent hydrocarbon radicals free of aliphatic unsaturation such as alkyl groups, particularly the lower alkyl group containing from 1 to 4 carbon atoms. Specifically illustrative of the substituted piperazines, suitably employed in this invention are 2-methylpiperazine, 2,5-dimethylpiperazine, 2,6 - dimethylpiperazine, 2,3,5,6 - tetramethylpiperazine, 2,5-dibutylpiperazine, 2,5 - dimethyl-3-ethylpiperazine, and the like.

Of the hydrocarbon substituted piperazine compounds, the preferred species correspond to one of the following general formulae:

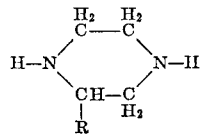

wherein R is hydrogen or a normal alkyl group containing from 1 to 4 carbon atoms; or

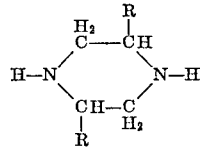

wherein R in each occurrence is hydrogen or an alkyl group containing from 1 to 4 carbon atoms. Stereo isomers such as cis or trans and mixtures thereof can also be used; or homopiperazine:

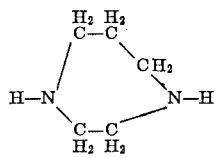

This invention can be further illustrated by the following examples of preferred embodiments, although it will be understood that these examples are included merely for purposes of illustration and are not intended to limit the scope of the invention.

Example 1

In a reaction vessel was placed 1.9123 grams (0.0222 mole) of piperazine, 40 grams of phenol (solvent) and 38.675 grams (0.0222 mole) of the phenyl carbonate-terminated TMCB diol polycarbonate ($x=8.96$). The reaction vessel was immersed in an oil bath preheated to 130° C. After heating for 10 minutes at this temperature, the flow of dry $N_2$ gas was initiated, bubbling it through the reaction mixture, and the bath temperature was raised slowly. At a bath temperature of 234° C. phenol started to distill from the reaction vessel (28 minutes after the initial heating). While phenol was being collected the bath temperature was kept between 234–240° C. The evolution of phenol lasted for 70 minutes, then the system was heated for an additional 60 minutes under vacuum. The polymer was isolated by first dissolving it in methylene chloride and then coagulating in methanol. Reduced viscosity of polymer ($CHCl_3$, 25° C.) was 0.49. The polymer contained 1.65 percent nitrogen which corresponds to 9.7 mole percent piperazine (theory is 10.04 mole percent). There was no indication of crystallinity. The polymer showed excellent weather resistance properties; there was no change in reduced viscosity after 1000 hours in a commercial Atlas XW Weatherometer.

Example 2

A reaction vessel containing 15.932 grams (0.0169 mole) of the phenyl carbonate-terminated TMCB diol polycarbonate (a prepolymer having an $x$ value of 4.27), and 1.4558 grams (0.0169 mole) of piperazine was immersed in an oil bath preheated to 150° C. The bath temperature was raised slowly until phenol began to distill (245° C.). After the evolution of phenol had ceased, the bath temperature was raised to 270° C. and the reaction was heated at this temperature for 10 minutes. The polymer was dissolved in methylene chloride and passed through a small neutral alumina column. The solvent was removed from the polymer by evaporation on aluminum foil. Reduced viscosity of polymer ($CHCl_3$, 25° C.) was 0.49. The polymer had a mole percent piperazine of 19 percent and was noncrystallizable.

Example 3

A reaction vessel containing 7.7663 grams (0.0129 mole) of the phenyl carbonate-terminated TMCB diol polycarbonate (a prepolymer having an $x$ value of 2.27), 1.1139 grams (0.0129 mole) of piperazine and a nitrogen inlet was placed in an oil bath preheated to 105° C. The temperature was raised slowly until phenol started to reflux. After refluxing for 1 hour, the phenol was distilled off. The polymer was treated and isolated as described in the previous experiment. Reduced viscosity of polymer ($CHCl_3$, 25° C.) was 0.49. The polymer was non-crystallizable and could not be crystallized. The mole percent of piperazine in the polymer was 30.6 percent.

Example 4

In a reaction vessel with an inlet tube reaching almost to the bottom were placed 9.229 grams (0.0640 mole) of TMCB diol, 1.378 grams (0.0160 mole) of piperazine, 30.753 grams (0.0800 mole) of the bis(phenyl carbonate) of TMCB diol ($x=1$) and 0.010 gram of lithium acetate dihydrate. The vessel was placed in an oil bath which had been preheated to 119° C. and was kept at 119–125° C. for 50 minutes; when the solid had almost melted, a slow stream of argon was bubbled through the reactants to provide an inert atmosphere and means of agitation. The temperature was then raised to 144° C. and held at 143–144° C. for 45 minutes. The temperature was again increased gradually, over about 1.25 hours, to 233° C., phenol then began to distill over. The mixture was held for 40 minutes at 230–233° C. and then for 40 minutes at 250° C., becoming very viscous. The temperature was further raised to 270° C., the pressure reduced to 0.5 millimeter, and held under these conditions for 10 minutes.

The polymer was isolated by dissolving in methylene chloride and coagulating in methanol. The yield was 22.6 grams (86 percent), reduced viscosity of polymer (0.2 gram per 100 milliliters in chloroform at 25° C.) was 0.72. Analysis indicated 1.76 percent nitrogen, corresponding to a piperazine content of 10.3 mole percent. The polymer was non-crystalline and non-crystallizable.

Example 5

In a reaction vessel with an inlet tube reaching almost to the bottom were placed 10.80 millimoles of TMCB diol, 1.20 millimoles of piperazine, 12.00 millimoles of the bis(phenyl carbonate) of TMCB diol ($x=1$) and 0.010 gram of lithium acetate dihydrate. The vessel was placed in an oil bath which had been preheated to 119° C. and was kept at 119–125° C. for 50 minutes; when the solid had almost melted, a slow stream of argon was bubbled through the reactants to provide an inert atmosphere and means of agitation. The temperature was then raised to 144° C. and held at 143–144° C. for 45 minutes. The temperature was again increased gradually, over about 1.25 hours, to 233° C., phenol then began to distill over. The mixture was held for 40 minutes at 230–233° C. and then for 40 minutes at 250° C., becoming very viscous. The temperature was further raised to 270° C., the pressure reduced to 0.5 millimeter, and held under these conditions for 10 minutes.

The polymer was isolated by dissolving in methylene chloride and coagulating in methanol. The yield was 85 percent, reduced viscosity of polymer (0.2 gram per 100 milliliters in chloroform at 25° C.) was 1.63. Nitrogen calculated at 0.97 percent, corresponding to a piperazine content of 5.0 mole percent. The polymer was non-crystalline and non-crystallizable.

Example 6

In aa rection vessel with an inlet tube reaching almost to the bottom were placed 7.20 millimoles of TMCB diol, 4.80 millimoles of piperazine, 12.00 millimoles of the bis(phenyl carbonate) of TMCB diol ($x=1$) and 0.010 gram of lithium acetate dihydrate. The vessel was placed in an oil bath which had been preheated to 119° C. and was kept at 119–125° C. for 50 minutes; when the solid had almost melted, a slow stream of argon was bubbled through the reactants to provide an inert atmosphere and means of agitation. The temperature was then raised to 144° C. and held at 143–144° C. for 45 minutes. The temperature was again increased gradually, over about 1.25 hours, to 233° C., phenol then began to distill over. The mixture was held for 40 minutes at 230–233° C. and then for 40 minutes at 250° C., becoming very viscous. The temperature was further raised to 270° C., the pressure reduced to 0.5 millimeter, and held under these conditions for 10 minutes.

The polymer was isolated by dissolving in methylene chloride and coagulating in methanol. The yield was 78 percent, reduced viscosity of polymer (0.2 gram per 100 milliliters in chloroform at 25° C.) was 1.77. Analysis indicated 3.76 percent nitrogen (calculated 3.53 percent), corresponding to a piperazine content of 21.2 mole percent (calculated for 20 percent). The polymer was non-crystalline and non-crystallizable.

Example 7

In a reaction vessel with an inlet tube reaching almost to the bottom were placed 9.204 millimoles of TMCB diol, 2.298 millimoles of trans-2,5-dimethyl piperazine, 11.500 millimoles of the bis(phenyl carbonate) of TMCB diol ($x=1$) and 0.010 gram of lithium acetate dihydrate. The vessel was placed in an oil bath which had been preheated to 119° C. and was kept at 119–125° C. for 50 minutes; when the solid had almost melted, a slow stream of argon was bubbled through the reactants to provide an inert atmosphere and means of agitation. The temperature was then raised to 144° C. and held at 143–144° C. for 45 minutes. The temperature was again increased gradually, over about 1.25 hours, to 233° C., phenol then began to distill over. The mixture was held for 40 minutes at 230–233° C. and then for 40 minutes at 250° C., becoming very viscous. The temperature was further raised to 270° C., the pressure reduced to 0.5 millimeter, and held under these conditions for 10 minutes.

The polymer was isolated by dissolving in methylene chloride and coagulating in methanol. The yield was not determined, reduced viscosity of polymer (0.2 gram per 100 milliliters in chloroform at 25° C.) was 0.47. Analysis indicated 1.71 percent nitrogen, corresponding to diamine content of 10.2 mole percent. The polymer was non-crystalline and non-crystallizable.

Example 8

In a reaction vessel with an inlet tube reaching almost to the bottom, 7.20 millimoles of TMCB diol, 4.80 millimoles of trans-2,5-dimethyl piperazine, 12.00 millimoles of the bis(phenyl carbonate) of TMCB diol ($x=1$) and 0.010 gram of lithium acetate dihydrate is placed. The vessel is then placed in an oil bath which has been preheated to 119° C. and is kept at 119–125° C. for 50 minutes; when the solid has almost melted, a slow stream of argon is bubbled through the reactants to provide an inert atmosphere and means of agitation. The temperature is then raised to 144° C. and held at 143–144° C. for 45 minutes. The temperature is again increased gradually, over about 1.25 hours, to 233° C., phenol then begins to distill over. The mixture is held for 40 minutes at 230–233° C. and then for 40 minutes at 250° C., becoming very viscous. The temperature is further raised to 270° C., the pressure reduced to 0.5 millimeter, and held under these conditions for 10 minutes.

The polymer is isolated by dissolving in methylene chloride and coagulating in methanol. The yield is 84 percent, reduced viscosity of polymer (0.2 gram per 100 milliliters in chloroform at 25° C.) is 0.48. Nitrogen content calculated at 3.50 percent, corresponding to a diamine content of 20 mole percent. The polymer is non-crystalline and non-crystallizable.

Example 9

In a reaction vessel with an inlet tube reaching almost to the bottom, 9.204 millimoles of TMCB diol, 2.298 millimoles of homopiperazine, 11.50 millimoles of the bis(phenyl carbonate) of TMCB diol ($x=1$) and 0.010 gram of lithium acetate dihydrate is placed. The vessel is then placed in an oil bath which has been preheated to 119° C. and is kept at 119–125° C. for 50 minutes; when the solid has almost melted, a slow stream of argon is bubbled through the reactants to provide an inert atmosphere and means of agitation. The temperature is then raised to 144° C. and held at 143–144° C. for 45 minutes. The temperature is again increased gradually, over about 1.25 hours, to 233° C., phenol then begins to distill over. The mixture is held for 40 minutes at 230–233° C. and then for 40 minutes at 250° C., becoming very viscous. The temperature is further raised to 270° C., the pressure reduced to 0.5 millimeter, and held under these conditions for 10 minutes.

The polymer is isolated by dissolving in methylene chloride and coagulating in methanol. The yield is 85 percent, reduced viscosity of polymer (0.2 gram per 100 milliliters in chloroform at 25° C.) was 0.5. Nitrogen content calculated at 1.70 percent, corresponding to a diamine content of 10 mole percent. The polymer is non-crystalline and non-crystallizable.

Example 10

A mixture of 0.6063 gram (4.204 millimoles) of TMCB diol, 0.1551 gram (1.801 millimoles) of piperazine, 3.3278 grams (6.000 millimoles) of the phenyl carbonate-terminated TMCB diol oligomer ($x=2$) and 0.0011 gram of lithium acetate dihydrate was allowed to react essentially as described in Example 4. The polymer obtained 2.53 grams (85 percent) had a reduced viscosity of 1.10. Analysis indicated the presence of 1.74 percent nitrogen, corresponding to 10.2 mole percent of piperazine. The polymer was non-crystalline and non-crystallizable.

What is claimed is:

1. A linear copolycarbonate/urethane resin comprising recurring structural units of the general formula:

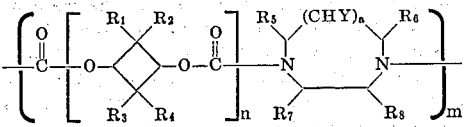

wherein $R_1$, $R_2$, $R_3$ and $R_4$ are selected from the group consisting of lower alkyl groups containing from 1 to 4 carbon atoms, Y, $R_5$, $R_6$, $R_7$, $R_8$ are selected from the group consisting of hydrogen and lower alkyl groups containing from 1 to 4 carbon atoms, $a$ is an integer from zero to one inclusive, $m$ is an integer having a value such that the reduced viscosity of the polymer is at least 0.4, and $n$ is an integer having a value of from about 3 to about 9.

2. A linear copolycarbonate/urethane resin as defined by claim 1 wherein $R_1$, $R_2$, $R_3$ and $R_4$ in each instance are methyl groups.

3. A linear copolycarbonate/urethane resin as defined by claim 1 wherein Y, $R_5$, $R_6$, $R_7$ and $R_8$ in each instance are hydrogen and $a$ is equal to one.

4. A linear copolycarbonate/urethane resin as defined by claim 1 wherein $R_5$, $R_6$, $R_7$ and $R_8$ in each instance are hydrogen and $a$ is equal to zero.

5. A linear copolycarbonate/urethane resin as defined by claim 1 wherein $R_5$, $R_6$ and $R_8$ are hydrogen, $R_7$ is a methyl group and $a$ is equal to zero.

6. A linear copolycarbonate/urethane resin as defined by claim 1 wherein $R_5$ and $R_8$ are hydrogen, $R_6$ and $R_7$ are methyl groups and $a$ is equal to zero.

7. A linear copolycarbonate/urethane resin as defined by claim 2 wherein the cyclobutylene moiety contains at least 35 mole percent of the trans moiety.

8. A linear copolycarbonate/urethane resin as defined by claim 2 wherein the cyclobutylene moiety contains at least 50 mole percent of the trans moiety.

9. A linear copolycarbonate/urethane resin as defined by claim 7 wherein Y, $R_5$, $R_6$, $R_7$ and $R_8$ in each instance are hydrogen and $a$ is equal to one.

10. A linear copolycarbonate/urethane resin as defined by claim 7 wherein $R_5$, $R_6$, $R_7$ and $R_8$ in each instance are hydrogen and $a$ is equal to zero.

11. A linear copolycarbonate/urethane resin as defined by claim 7 wherein $R_5$, $R_6$ and $R_8$ are hydrogen, $R_7$ is a methyl group and $a$ is equal to zero.

12. A linear copolycarbonate/urethane resin as defined by claim 7 wherein $R_5$ and $R_8$ are hydrogen, $R_6$ and $R_7$ are methyl groups and $a$ is equal to zero.

References Cited

UNITED STATES PATENTS

| | | | |
|---|---|---|---|
| 2,731,446 | 1/1956 | Wittbecker | 260—77.5 |
| 2,962,470 | 11/1960 | Jung | 260—858 |
| 3,038,884 | 6/1962 | Martin et al. | 260—77.5 |
| 3,215,668 | 11/1965 | Bissinger et al. | 260—77.5 |

MURRAY TILLMAN, Primary Examiner.

J. T. GOOLKASIAN, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,402,150                              September 17, 1968

John J. Gardikes et al.

It is certified that error appears in the above identified patent and that said Letters Patent are hereby corrected as shown below:

Column 7, line 22, "9" should read -- 19 --.

Signed and sealed this 3rd day of February 1970.

(SEAL)
Attest:

Edward M. Fletcher, Jr.
Attesting Officer

WILLIAM E. SCHUYLER, JR.
Commissioner of Patents